3,413,306
ALKYLENE SULFOXIDES
Gordon E. Hartzell, Midland, Mich., assignor to The Dow Chemical Company, Midland, Mich., a corporation of Delaware
No Drawing. Filed Feb. 7, 1966, Ser. No. 525,321
10 Claims. (Cl. 260—327)

ABSTRACT OF THE DISCLOSURE

Alkylene episulfoxides are made by oxidizing the corresponding episulfides with metaperiodate ion. The products are useful as herbicides and chemical intermediates.

---

This invention relates to new compounds, vicinal alkylene sulfoxides, and methods for making these compounds. The term "alkylene" as used herein includes substituted alkylene, such as phenylalkylene, haloalkylene, etc. as well as cycloalkylene.

In general, sulfoxides can be made by the oxidation of the corresponding sulfides. Heretofore, however, all attempts to make vicinal ethylene sulfoxide, by oxidation of the sulfide or by other methods, have resulted in failure. These failures have led to the conclusion that vicinal alkylene sulfoxides are incapable of existence. Thus, Culvenor et al. have stated:

"A characteristic unsuspected property of the ethylene sulphide ring is its inability to exist in a stable condition when the sulfur atom has a higher valency than two." (J. Chem. Soc., 1949, 282 at page 284.)

Dittmer and Levy, J. Orig. Chem. 30, 636 (1965) were able to make one such sulfoxide wherein the ring was stabilized by being fully substituted with large groups, including two benzoyl groups. Their compounds, dibenzoylstilbene sulfoxide and sulfone, were made by oxidizing the sulfide with hydrogen peroxide.

According to the present invention, vicinal alkylene sulfoxides are readily made in good yield and are isolated in pure, stable form by a process comprising oxidizing the sulfide with metaperiodate ion. The latter is conveniently provided by an alkali metal metaperiodate, preferably the sodium or potassium salt. This is particularly surprising in view of the fact that other peroxy compounds useful for oxidizing acyclic sulfides to sulfoxides, such as hydrogen peroxide, benzoyl peroxide and perbenzoic acid, cannot be used to oxidize the present vicinal-alkylene sulfides to alkylene sulfoxides (Hesse et al., Chem. Ber. 90, 2106 (1957); C. A., 52, 10064 (1958)).

The process of the invention is ordinarily conducted in an inert solvent in which the reactants are soluble. Water alone can be used but the addition thereto of an inert water-miscible organic solvent, such as methanol, improves the solubility of the alkylene sulfide therein. The reaction can be conducted at any temperature up to that at which the product is destroyed, suitable temperatures being about −20–80° C. The reaction is rapid, even at low temperatures, suitable reaction times often being less than 1 hour. The two reactants are consumed in substantially a 1:1 molar ratio; however, an excess of either may be used if desired.

The alkylene sulfoxide may be separated from the reaction mixture by any convenient means, such as distillation, solvent extraction or selective adsorption. If a solvent, such as aqueous methanol, is used in which the by-product iodate is substantially insoluble, this salt can be thus precipitated and then removed by filtration or decantation. The solvent can then be removed by distillation at suitably low temperature, thus leaving the crude product. This can be distilled under suitable vacuum, thus avoiding thermal decomposition or reaction of the product with solvent or other impurity. The practice of the invention is illustrated by the following examples.

Example 1.—Ethylene sulfoxide

Sodium metaperiodate (62.5 g., 0.32 mole) was dissolved in 250 ml. of water. To this stirred solution was added a solution of 18.0 g. (0.30 mole) of ethylene sulfide in 75 ml. of methanol at a dropwise rate such that the temperature was controlled at 20–25° C. When the addition was complete, the resulting slurry was stirred for 30 minutes and then cooled to 0° and filtered to remove the precipitated sodium iodate. The filtrate was extracted ten times with 75 ml. portions of chloroform. The combined extracts were dried over anhydrous magnesium sulfate and the solvent removed by distillation under reduced pressure. The crude product was distilled to yield 12.0 g. (52%) of ethylene sulfoxide; B.P. 45–47° at 2.0 mm.; $n_D{}^{25} = 1.5205$. It had a strong characteristic infrared absorption band at 1080 cm.$^{-1}$.

Analysis.—Calculated for $C_2H_4SO$: S, 42.1%. Found: S, 42.2%.

Example 2.—1,2-propylene sulfoxide

Propylene sulfide (0.3 mole) was reacted with sodium metaperiodate (0.315 mole) by the procedure of Example 1 and the product isolated similarly, thus producing 14.3 g. of product showing a strong infrared absorption band at 1070–1090 cm.$^{-1}$, this band being characteristic of sulfoxide.

Example 3.—Cyclohexene sulfoxide

Cyclohexene sulfide (3.5 g., 0.031 mole) dissolved in 60 ml. of methanol was oxidized with sodium metaperiodate (6.9 g., 0.032 mole) dissolved in 60 ml. of water, the reaction and work-up procedure being essentially that used in the above examples, thus producing 3.3 g. of the desired product. It had the characteristic sulfoxide absorption band at 1070 cm.$^{-1}$.

Example 4.—Styrene sulfoxide

By use of the procedure of the above examples, 2.8 g. of styrene sulfoxide was produced from 4.2 g. of styrene sulfide. It showed a strong infrared absorption band at 1080 cm.$^{-1}$.

By the same general procedure shown above, other alkylene sulfoxides are produced from the corresponding sulfides by oxidation with metaperiodate ion. The preferred sulfoxides are those having at least one hydrogen atom on each carbon atom of the 3-membered ring; i.e. those having the formula

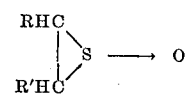

wherein R and R' are H or hydrocarbon. Either or both R and R' may be alkyl, cycloalkyl, aryl or other hydrocarbon radicals or they may be joined together to form a cycloalkyl ring of 5 to 6 carbon atoms, as in cyclopentene or cyclohexene sulfoxide. Also, they may bear inert substituents such as halogen, alkyl, alkoxy, aryl and aryloxy radicals. Examples of such sulfoxides include 1,2- and 2,3-butylene sulfoxides, 1-chloro-2,3-propylene sulfoxide, 1-phenoxy-2,3-propylene sulfoxide, 1-(chlorophenyl)-1,2-butylene sulfoxide, 9,10-octadecene sulfoxide, 1,4-diphenyl-2,3-butylene sulfoxide, 1,2-diphenylethylene sulfoxide and the like. The particularly preferred compounds are those of the above formula wherein R and R' are H, lower alkyl (i.e. 1–8 carbon atoms) or phenyl.

The compounds of the invention are useful as chemical intermediates. They are biologically active, being toxic to many weeds, insects, snails and other objectionable forms of life. For example, ethylene sulfoxide when applied at a rate of 20 lb. per acre effectively prevents the germination and growth of pigweeds and radish. A concentration of 5 parts per million of the active compound completely inhibits the growth of crabgrass. A concentration of only 2 p.p.m. kills 50% of ramshorn snails.

I claim:
1. A compound having the formula

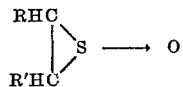

wherein each of R and R' is H or an inert alkyl, cycloalkyl or aryl group and wherein one of R and R' may bear one inert substituent of the group consisting of halogen, alkyl, alkoxy, aryl and aryloxy, provided that neither R nor R', including any such substituent, may contain more than 8 carbon atoms, and further provided that R and R' together with the carbon atoms to which they are attached may form a cycloalkyl ring of 5 to 6 carbon atoms.

2. The compound of claim 1 wherein R is H.
3. The compound of claim 1 wherein R is phenyl.
4. The compound of claim 2 wherein R' is H.
5. The compound of claim 2 wherein R' is $CH_3$.
6. The compound of claim 2 wherein R' is phenyl.
7. The compound of claim 1 wherein R and R' are joined to form, with the two carbon atoms to which they are attached, a cycloalkyl ring of 5 to 6 carbon atoms.
8. The compound of claim 7 wherein the cycloalkyl ring contains 6 carbon atoms.
9. The process of making a vicinal alkylene sulfoxide which comprises reacting by contacting a vicinal alkylene sulfide with metaperiodate ion.
10. The process of claim 9 wherein the metaperiodate ion is provided by an alkali metal metaperiodate.

References Cited
UNITED STATES PATENTS
2,694,073    11/1954    Soloway _____ 260—327

JAMES A. PATTEN, *Primary Examiner.*